Sept. 13, 1932.   W. SCHARFF   1,876,765
ADJUSTABLE BEARING BUSH
Filed July 16, 1928
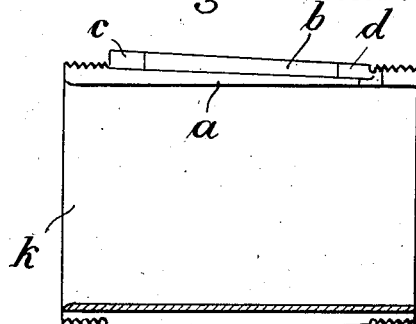
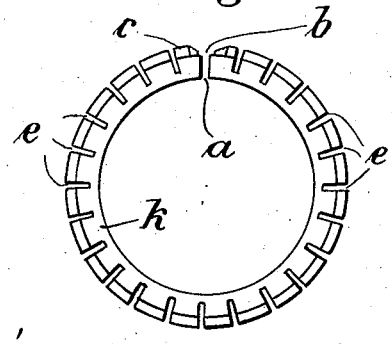
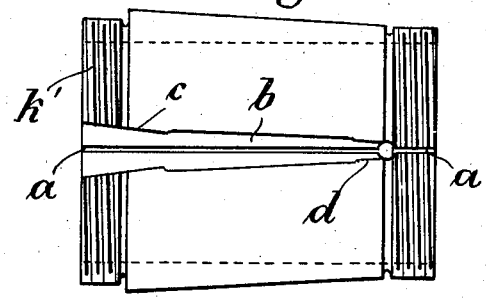
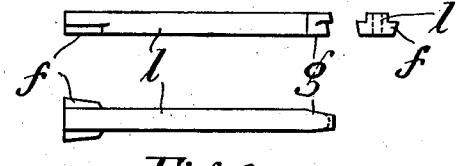
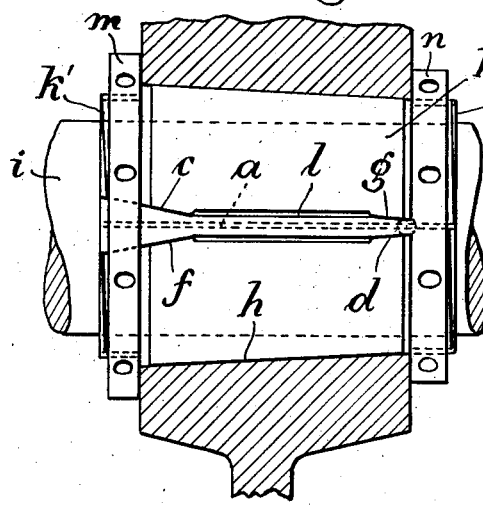
Inventor:
Willy Scharff
by
Kuushury
Atty.

Patented Sept. 13, 1932

1,876,765

UNITED STATES PATENT OFFICE

WILLY SCHARFF, OF FRANKFORT-ON-THE-MAIN, GERMANY

ADJUSTABLE BEARING BUSH

Application filed July 16, 1928, Serial No. 293,020, and in Germany February 2, 1928.

My invention relates to adjustable bearing bushes. It is an object of my invention to provide means for adjusting a bush of this type without deformation. To this end I provide a tapering recess in the bush in connection with the usual longitudinal slot, and insert a tapering fillet in the recess.

Heretofore, shafts, quills, tail spindles and other parts of drill presses, lathes, grinding machines and the like, in which great exactitude is permanently required, were supported in adjustable bushes made of bronze and other alloys and the means for adjusting such bushes comprised a tapering face on the outside of the bushes which engaged a corresponding bore in the bearing, the bush being slotted longitudinally and threaded at either end, and circular nuts being seated on the threaded ends of the bush so as to force it into its tapering seats. In order to obtain a good fit of the bush the wall thickness of which is generally considerable, it is provided with parallel flutes on the outside which extend to a short distance from the inner face of the bush.

Bushes designed in this manner involve the drawback that stresses due to heat or forces cause irregular deformation in the region of the longitudinal slot which are liable to bring about seizing of the bush on the shaft or spindle. Various attempts have been made to overcome this drawback but without complete success. Conditions were improved by inserting jibs of lead or hard wood in the slot but such jibs do not permit frequent readjustment of the bushes. It has also been attempted to replace the comparatively resilient jibs of lead or wood by comparatively rigid jibs which, however, must be removed and remachined as often as the bush is adjusted. This obviously involves not only labour and loss of time but also requires great exactitude and therefore this solution is not satisfactory either. The solution of providing one or more wedges in the slot which are adapted to be adjusted by means of separate screws also involves the drawback of complication, and besides it is necessary to adjust the wedges separately after the bush has been reset so that the adjustment of the bush is often interfered with by the subsequent adjustment of the wedges.

All these drawbacks are overcome in my invention which consists in providing a tapering recess in the bush and inserting therein a tapering fillet or wedge. The recess may be tapering throughout or only for part of its length, for instance, at either end, and otherwise parallel. The tapering fillet or wedge to fit the recess is of comparatively rigid material such as steel and its length may be equal to the conical bore in the frame in which the bush is fitted, and the conical face of the bush may be as long as the bearing, minus the limit within which the sleeve is displaced axially for adjustment.

It is a particular feature of my invention that the angle of the tapering fillet or wedge is a definite function of the taper of the sleeve, and may be calculated therefrom so as to maintain the faces in fitting relation for any position of said bush in its bearing.

In the drawing affixed to this specification and forming part thereof a bush equipped with my improved fillet or wedge is illustrated diagrammatically by way of example.

In the drawing

Fig. 1 is a longitudinal section,

Fig. 2 is a plan view, and

Fig. 3 is an end elevation of the sleeve viewed from the left in Fig. 2,

Fig. 4 is a horizontal section of a bearing with a bush in position,

Fig. 5 is an elevation,

Fig. 6 is a plan view, and

Fig. 7 is an end elevation of the tapering fillet or wedge, and

Fig. 8 is a diagram illustrating the calculation of the taper.

Referring now to the drawing, $k$ is a conical bush adapted to be fitted in a bearing $h$ of a machine of any kind, $a$ is a slot extending throughout the length of the bush in the usual manner, $b$ is a recess at either side of the slot which may be designed with a taper throughout or, as illustrated, is provided with tapering ends $c$ and $d$ only and otherwise parallel, $e$ are the usual flutes in the outer face of the bush, these flutes being not shown in Figs. 2 and 4 for the sake of simplicity, $k'$, $k'$ are the threaded ends of the bush $k$, $m$ and $n$ are the usual circular nuts on the threaded ends $c$, $d$, $f$ and $g$ are the tapering ends of the fillet or wedge $l$, Figs. 5, 6 and 7, the angle of which is equal to the angle of the faces $c$ and $d$, while the body of the fillet is parallel in accordance with the intermediate part of the recess $b$.

Referring now to Fig. 4, this shows the bush $k$ assembled in the bearing $h$, with a shaft or other part $i$ in the bush, the circular nuts $m$ and $n$ on the threaded ends $k'$ holding the bush in position. It will also appear from this figure, that the fillet $l$ only engages the tapers $c$ and $d$ of the recess $b$ with its corresponding faces $f$ and $g$, but not the intermediate parallel portion.

If it is desired to re-adjust the bush after its inside diameter has been increased by wear, the nut $m$ at the larger end of the bush is unscrewed and the nut $n$ at its smaller end is set until the wear has been made up, and then the nut $m$ is re-set. The fillet $l$ remains in the same position with respect to the bearing $h$ and only the bush $k$ is displaced with respect to the inclined faces $f$ and $g$ of the fillet.

It follows that my invention combines the feature of extreme simplicity as to construction and operation, permanent and rigid connection of its parts, and elimination of any tendency of unintentional reduction of the inside diameter and consequently elimination of seizing.

Referring now to Fig. 8, D is the inside diameter of the bearing $h$ at one end, $d'$ is its inside diameter at the other end, $d$ is the outside diameter of the bush $k$ at its smaller end, $D'$ is its outside diameter at its larger end after it has been shifted from the position $o, p$ to the postion $q, r$, for the distance $z$, and L is the length of the bearing. The angle of the tapering faces $f$, $g$ is calculated by plotting the displacement of one end of the slot $a$, for instance, the point $s$ at the diameter D into the position $t$ on the diameter $D'$ after the bush has been displaced through $z$, and the width of the slot $a$ has been reduced to nil along the line $y$. The angle $\alpha$ which the line connecting the points $s$ and $t$ includes with the axis of the bush is the angle of the faces $f$, $g$. With D and $d$, $D'$ and $d'$ given the taper of the bush in per cent of its length is readily determined and from the displacement $z$ and the taper the angle $\alpha$ is calculated.

I wish it to be understood that I do not desire to be limited to the exact details of construction shown and described for obvious modifications will occur to a person skilled in the art.

I claim:—

1. An adjustable tapering bearing bushing having a longitudinal slot, a tapering recess in connection with said slot, and a wedge in said recess of a length equal to the thickness of the member in which said bushing is used, the taper of the mating faces of said wedge and said recess being so determined with respect to the taper of said bushing as to maintain the faces in fitting relation for any position of said bushing in its bearing.

2. An adjustable tapering bearing bushing having a longitudinal slot, a recess in said slot, tapering faces projecting inwardly from the walls of said recess, a wedge in said recess of a length equal to the thickness of the member in which said bushing is used, and faces on said wedge adapted to fit said inwardly projecting faces, the taper of the faces on said wedge and in said recess being so determined with respect to the taper of said bushing as to maintain the faces in fitting relation for any position of said bushing in its bearing.

In testimony whereof I affix my signature.

WILLY SCHARFF.